Aug. 26, 1947.    A. B. PARKER    2,426,521
LENS ATTACHMENT FOR CAMERAS
Filed March 16, 1946

INVENTOR.
ALTON B. PARKER
BY Harry Lee Dodson
ATTORNEY

Patented Aug. 26, 1947

2,426,521

UNITED STATES PATENT OFFICE 2,426,521

LENS ATTACHMENT FOR CAMERAS

Alton B. Parker, Houston, Tex.

Application March 16, 1946, Serial No. 654,937

3 Claims. (Cl. 88—57)

My invention relates to cameras used for taking still pictures and has for its object to provide an attachment which can be detachably secured to the camera in front of the lens so as to change the image of the object being photographed.

The principal object of my invention is to provide an attachment for a camera which can be quickly put in place and the picture taken without the subject realizing that the resultant photograph will present a distorted image with the person either appearing extremely thin and very tall or very short, fat and stout.

A further object is to accomplish the result in a very inexpensive manner.

A further object is to construct the attachment so that it can be quickly and easily attached to or detached from a camera and to construct it in various sizes so it can be used on the different styles of still cameras.

A further object is to so construct the attachment so that it will be reversible in order that one attachment may be employed to produce a picture which will show either the elongated thin figure or the short fat one, depending on how the attachment is secured to the camera.

My means of accomplishing the foregoing objects may be more readily understood by reference to the accompanying drawings which are hereunto annexed and form a part of this specification in which.

Similar reference numerals refer to similar parts throughout the entire specification.

Figure 1:
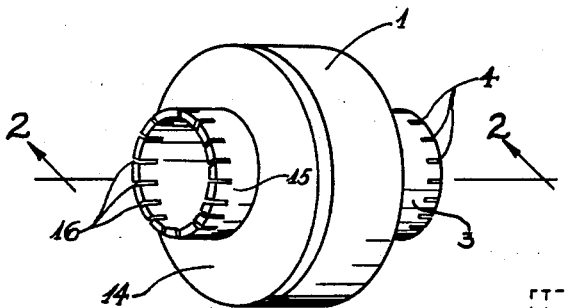
Fig. 1 is an isometric perspective view of my invention.
Figure 3:
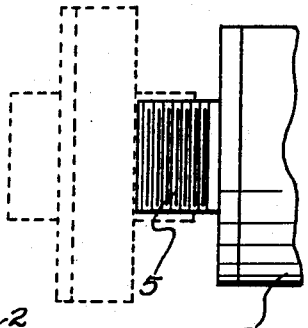
Fig. 3 shows a fragmentary portion of the camera with the attachment shown in dotted lines.

As shown in the drawings my improved attachment comprises an annular member 1, which preferably has an end wall 2. This end wall has a laterally extending cylindrical portion 3. The end of the cylindrical portion 3, may have a plurality of slots 4, cut or formed therein for convenient clamping on of portion 5 to the camera 6. Though it will be clear to persons skilled in the art that any suitable or convenient means of detachably securing the device in place may be employed.

I have only shown a fragmentary detail of the camera 6, as obviously it forms no part of my invention.

Inside the annular member 1, I form a shoulder 7, against which is placed a lens 8, one side 9 of which is convex, and the other side 10, of which is concave. An annular gasket 11 is fitted to the internal surface of the member 1, and bears against the lens to hold it in place.

I cut internal threads 12 on the inner surface 13, of the annular member 7, to which I fit a bushing 14, which has external threads cut which are fitted to and coincide with the internal threads 12. By tightening the bushing 14, pressure is exerted on the gasket 11, and this serves to hold the lens 8 in place. This bushing 14 also has a lateral cylindrical extension 15, similar to the cylindrical extension 3, formed on the end wall 2, of the circular member 1.

This cylindrical extension 15 also is provided with slots 16, which are similar to the slots 4, formed on the cylindrical extension 3, which are designed to serve the same purpose and perform the same function; namely, to grip and hold my device on the projection 5 on the camera.

Figure 2:
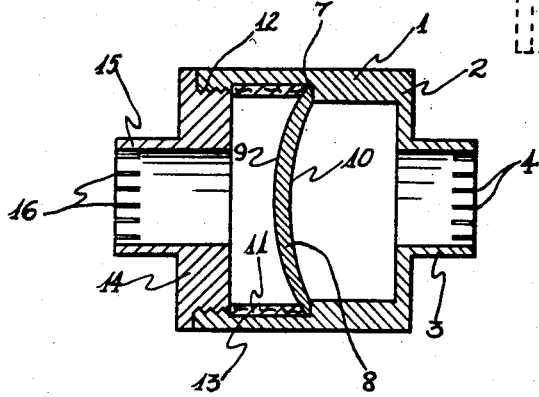
Fig. 2 is a vertical sectional view taken on the line 2—2 in the direction of the arrows.

The use of my improvement is as follows:

The holder of the camera first decided whether he wishes to have the photograph he takes to show the individual being photographed as long and skinny, or short, squat and fat. If the first, he will use the attachment as shown in Fig. 2, with the convex side 9 of the lens 8, as illustrated, and the result will be to produce a distorted image, of the person.

On the other hand if he desires to picture the subject as a squat stout person, all that is necessary to do is to reverse the attachment and have the concave side of the lens facing the person.

Although I have described specific details as the means of attachment of the device to the camera, for example, the cylindrical portion 15 might be omitted and the user could unscrew the bushing 14 and the gasket 11, and merely reverse the lens 8, and yet utilize my invention of providing means detachably secured to a camera to take a distorted picture therefore, I do not wish to be understood as limiting myself thereto as obviously other minor details of construction may be employed for that purpose which will readily suggest themselves to those persons who are skilled in the art. Hence I only intend to be limited to such details as appear in the hereinafter contained claims.

Having described my invention what I regard as new and desire to secure by Letters Patent is:

1. In a device to be detachably secured in front of the lens of a camera for taking still pictures, an annular member, a lens one side of which is convex and the opposite side is concave mounted in said member, an annular gasket which abuts said lens to hold it in place, a bushing threaded into said annular member which presses said gasket against said lens, a laterally extending cylindrical portion on said bushing, an end wall on said annular member, having a central opening therethrough, a cylindrical portion which extends laterally from said end wall, means on each cylindrical portion to detachably hold said device on said camera.

2. In a device to reversibly attach a meniscus distorting lens to the objective mount of a camera, a cylindrical frame, an annular recess therein, there being threads in said annular recess adjacent one end, a distorting meniscus lens mounted in said annular recess, said frame having a coaxial tubular light passage extension, an annular gasket abutting said distorting lens, a closure member having a central light passage opening therethrough, said member adapted to engage said threads of said frame and compress said annular gasket, said closure means having a tubular light passage extension thereon, each of said light passages being coaxial with said lens, and means on each extension to attach said device to the objective mount of a camera.

3. In a device to reversibly attach a meniscus distorting lens to the objective mount of a camera, a cylindrical frame, an annular recess therein, a distorting meniscus lens mounted in said recess, there being a cap having a central opening therein adapted to engage one end of said frame, there being coaxial light passage tubular members extending from said frame and said cap, an annular gasket which holds said lens in place, and resilient fingers formed by slots on each of said tubular members to attach said device to the objective mount of a camera.

ALTON B. PARKER.

REFERENCES CITED

The following references are of record in the file of this patent:

UNITED STATES PATENTS

| Number | Name | Date |
|---|---|---|
| 1,169,731 | Mengel | Jan. 25, 1916 |
| 1,627,892 | Frederick | May 10, 1927 |
| 2,352,844 | Loebe | July 4, 1944 |
| 2,372,223 | Nagel | Mar. 27, 1945 |
| 1,966,149 | Stevens | July 10, 1934 |
| 2,387,441 | Hamilton | Oct. 23, 1945 |